(12) United States Patent
Anstadt

(10) Patent No.: US 12,440,338 B2
(45) Date of Patent: Oct. 14, 2025

(54) MINIMALLY INVASIVE HEART PUMP WITH MODULAR ADJUSTABLE CONSTRUCT INSERTION

(71) Applicant: Lifebridge Technologies, LLC, Dayton, OH (US)

(72) Inventor: Mark P. Anstadt, Kettering, OH (US)

(73) Assignee: Lifebridge Technologies LLC, Dayton, OH (US)

( * ) Notice: Subject to any disclaimer, the term of this patent is extended or adjusted under 35 U.S.C. 154(b) by 0 days.

(21) Appl. No.: 18/530,157

(22) Filed: Dec. 5, 2023

(65) Prior Publication Data

US 2024/0099846 A1    Mar. 28, 2024

Related U.S. Application Data

(63) Continuation-in-part of application No. 18/509,260, filed on Nov. 14, 2023, and a continuation-in-part of
(Continued)

(51) Int. Cl.
*A61F 2/24* (2006.01)
*A61M 60/191* (2021.01)
(Continued)

(52) U.S. Cl.
CPC ......... *A61F 2/2481* (2013.01); *A61M 60/191* (2021.01); *A61M 60/468* (2021.01);
(Continued)

(58) Field of Classification Search
CPC ............ A61F 2/2481; A61F 2002/2484; A61F 2250/0003; A61F 2250/0058;
(Continued)

(56) References Cited

U.S. PATENT DOCUMENTS

| | | | |
|---|---|---|---|
| 2,826,193 | A | 3/1958 | Vineberg |
| 2,889,780 | A | 6/1959 | Binford |

(Continued)

FOREIGN PATENT DOCUMENTS

| | | |
|---|---|---|
| WO | WO 00/78375 | 12/2000 |
| WO | WO2005/091860 | 10/2005 |
| WO | WO2006/122036 | 11/2006 |

*Primary Examiner* — Pamela M. Bays
(74) *Attorney, Agent, or Firm* — LaMorte & Associates P.C

(57) ABSTRACT

A system and method for the installation and operation of a cardiac assist device. Flexible guides are advanced into a prepared space using minimally invasive techniques. A heart pump construct is advanced into position in the pericardial area along the flexible guides. Once in position, the heart pump construct is activated while still engaged with the flexible guides. The flexible guides provide structural integrity to the heart pump construct needed in order for the heart pump construct to function properly. The forces supplied to the heart by the heart pump construct are affected by the presence of the flexible guides. The structure of the flexible guides, the position of the flexible guides and the structure of the heart pump construct are customized to supply the forces needed by a particular heart in order to assist the heart in pumping more efficiently.

5 Claims, 11 Drawing Sheets

Related U.S. Application Data application No. 18/447,786, filed on Aug. 10, 2023, now Pat. No. 12,115,363, and a continuation-in-part of application No. 18/160,963, filed on Jan. 27, 2023, now Pat. No. 11,896,812, said application No. 18/509,260 is a continuation-in-part of application No. 17/825,343, filed on May 26, 2022, which is a continuation-in-part of application No. 17/208,776, filed on Mar. 22, 2021, now Pat. No. 11,383,076.

(60) Provisional application No. 63/086,478, filed on Oct. 1, 2020.

(51) Int. Cl.
*A61M 60/468* (2021.01)
*A61M 60/289* (2021.01)

(52) U.S. Cl.
CPC ............. *A61F 2002/2484* (2013.01); *A61F 2230/0067* (2013.01); *A61F 2250/0003* (2013.01); *A61F 2250/0058* (2013.01); *A61M 60/289* (2021.01)

(58) Field of Classification Search
CPC ... A61F 2230/0067; A61M 2205/0216; A61M 2210/125; A61M 60/00; A61M 60/191; A61M 60/468
See application file for complete search history.

(56) References Cited

U.S. PATENT DOCUMENTS

| | | | |
|---|---|---|---|
| 3,053,249 A | 9/1962 | Smith | |
| 3,233,607 A | 2/1966 | Bolie | |
| 3,279,464 A | 10/1966 | Kline | |
| 3,304,501 A | 2/1967 | Ruthenberg | |
| 3,371,662 A | 3/1968 | Heid | |
| 3,376,863 A | 4/1968 | Kolobow | |
| 3,449,767 A | 6/1969 | Bolie | |
| 3,455,298 A | 7/1969 | Anstadt | |
| 3,478,737 A | 11/1969 | Rassman | |
| 3,513,836 A | 5/1970 | Sausse | |
| 3,587,567 A | 6/1971 | Schiff | |
| 3,590,815 A | 7/1971 | Schiff | |
| 3,613,672 A | 10/1971 | Schiff | |
| 3,674,381 A | 7/1972 | Schiff | |
| 4,048,990 A * | 9/1977 | Goetz | A61M 60/191 |
| | | | 601/153 |
| 4,192,293 A | 3/1980 | Asrican | |
| 4,281,669 A | 8/1981 | MacGregor | |
| 4,448,190 A | 5/1984 | Freeman | |
| 4,536,893 A | 8/1985 | Parravicini | |
| 4,609,176 A | 9/1986 | Powers | |
| 4,621,617 A | 11/1986 | Sharma | |
| 4,662,358 A | 5/1987 | Farrar | |
| 4,684,143 A | 8/1987 | Sato | |
| 4,957,477 A | 9/1990 | Lundback | |
| 4,979,936 A | 12/1990 | Stephenson | |
| 5,066,111 A | 11/1991 | Inokuchi | |
| 5,089,017 A | 2/1992 | Young | |
| 5,098,369 A | 3/1992 | Heilman et al. | |
| 5,098,442 A | 3/1992 | Grandjean | |
| 5,119,804 A | 6/1992 | Anstadt | |
| 5,131,905 A | 7/1992 | Grooters | |
| 5,156,154 A | 10/1992 | Valenta, Jr. et al. | |
| 5,158,978 A | 10/1992 | Rubin | |
| 5,169,381 A | 12/1992 | Snyders | |
| 5,199,804 A | 4/1993 | Rimbey et al. | |
| 5,205,722 A | 4/1993 | Hammond | |
| 5,256,132 A * | 10/1993 | Snyders | A61B 17/00234 |
| | | | 600/16 |
| 5,273,518 A | 12/1993 | Lee et al. | |
| 5,322,067 A | 6/1994 | Prater | |
| 5,330,505 A | 7/1994 | Cohen | |
| 5,364,337 A | 11/1994 | Guiraudon et al. | |
| 5,368,451 A | 11/1994 | Hammond | |
| 5,374,287 A | 12/1994 | Rubin | |
| 5,383,840 A | 1/1995 | Heilman et al. | |
| 5,385,528 A | 1/1995 | Wilk | |
| 5,429,584 A | 7/1995 | Chiu | |
| 5,476,502 A | 12/1995 | Rubin | |
| 5,496,353 A | 3/1996 | Grandjean et al. | |
| 5,533,958 A | 7/1996 | Wilk | |
| 5,558,617 A | 9/1996 | Heilman et al. | |
| 5,562,595 A | 10/1996 | Neisz | |
| 5,658,237 A | 8/1997 | Francischelli | |
| 5,674,259 A | 10/1997 | Gray | |
| 5,697,884 A | 12/1997 | Francischelli et al. | |
| 5,697,952 A | 12/1997 | Francischelli et al. | |
| 5,707,336 A | 1/1998 | Rubin | |
| 5,713,954 A | 2/1998 | Rosenberg et al. | |
| 5,716,379 A | 2/1998 | Bourgeois et al. | |
| 5,738,627 A | 4/1998 | Kovacs et al. | |
| 5,749,839 A | 5/1998 | Kovacs | |
| 5,769,800 A | 6/1998 | Gelfand et al. | |
| 5,800,334 A | 9/1998 | Wilk | |
| 5,861,558 A | 1/1999 | Buhl et al. | |
| 5,876,345 A | 3/1999 | Eaton et al. | |
| 5,902,229 A | 5/1999 | Tsitlik et al. | |
| 5,908,378 A | 6/1999 | Kovacs et al. | |
| 5,910,124 A | 6/1999 | Rubin | |
| 5,919,209 A | 7/1999 | Schouten | |
| 5,971,910 A | 10/1999 | Tsitlik et al. | |
| 5,971,911 A | 10/1999 | Wilk | |
| 5,980,571 A | 11/1999 | Nomura et al. | |
| 6,042,532 A | 3/2000 | Freed et al. | |
| 6,044,298 A | 3/2000 | Salo et al. | |
| 6,059,750 A | 5/2000 | Fogarty et al. | |
| 6,076,013 A | 6/2000 | Brennan et al. | |
| 6,095,968 A | 8/2000 | Snyders | |
| 6,110,098 A | 8/2000 | Renirie et al. | |
| 6,123,726 A | 9/2000 | Mori et al. | |
| 6,132,363 A | 10/2000 | Freed et al. | |
| 6,183,412 B1 | 2/2001 | Benkowski et al. | |
| 6,206,820 B1 | 3/2001 | Kazi et al. | |
| 6,224,540 B1 | 5/2001 | Lederman et al. | |
| 6,238,334 B1 | 5/2001 | Easterbrook, III et al. | |
| 6,251,061 B1 | 6/2001 | Hastings et al. | |
| 6,254,525 B1 | 7/2001 | Reinhardt et al. | |
| 6,282,445 B1 | 8/2001 | Reinhardt et al. | |
| 6,298,266 B1 | 10/2001 | Rubin et al. | |
| 6,309,380 B1 | 10/2001 | Larson et al. | |
| 6,328,689 B1 | 12/2001 | Gonzalez et al. | |
| 6,408,205 B1 | 6/2002 | Renirie et al. | |
| 6,432,039 B1 | 8/2002 | Wardle | |
| 6,438,411 B1 | 8/2002 | Guttman et al. | |
| 6,464,655 B1 | 10/2002 | Shahinpoor | |
| 6,485,407 B2 | 11/2002 | Alferness et al. | |
| 6,508,756 B1 | 1/2003 | Kung et al. | |
| 6,540,659 B1 | 4/2003 | Milbocker | |
| 6,547,716 B1 | 4/2003 | Milbocker | |
| 6,572,534 B1 | 6/2003 | Milbocker et al. | |
| 6,602,182 B1 | 8/2003 | Milbocker | |
| 6,612,978 B2 | 9/2003 | Lau et al. | |
| 6,616,596 B1 | 9/2003 | Milbocker | |
| 6,622,045 B2 | 9/2003 | Snell et al. | |
| 6,626,821 B1 | 9/2003 | Kung et al. | |
| 6,641,604 B1 | 11/2003 | Adelman et al. | |
| 6,682,474 B2 | 1/2004 | Lau et al. | |
| 6,730,016 B1 | 5/2004 | Cox et al. | |
| 6,757,561 B2 | 6/2004 | Rubin et al. | |
| 6,808,483 B1 * | 10/2004 | Ortiz | A61B 17/00234 |
| | | | 600/16 |
| 6,846,296 B1 | 1/2005 | Milbocker et al. | |
| 6,971,127 B2 | 12/2005 | Richards | |
| 7,331,221 B2 | 2/2008 | Wise et al. | |
| 7,494,459 B2 | 2/2009 | Anstadt et al. | |
| 7,871,366 B2 | 1/2011 | Criscione et al. | |
| 8,187,160 B2 | 5/2012 | Criscione et al. | |
| 8,460,181 B2 | 6/2013 | Saadat et al. | |
| 10,463,496 B2 | 11/2019 | Criscione et al. | |
| 11,191,944 B2 | 12/2021 | Tuval et al. | |
| 11,511,102 B2 | 11/2022 | Criscione et al. | |

(56) References Cited

U.S. PATENT DOCUMENTS

| | | |
|---|---|---|
| 12,115,363 B1 | 10/2024 | Anstadt |
| 12,161,857 B2 | 12/2024 | Saul et al. |
| 2001/0002445 A1 | 5/2001 | Vesely |
| 2001/0041821 A1 | 11/2001 | Wilk |
| 2002/0173693 A1 | 11/2002 | Landesberg |
| 2003/0032855 A1 | 2/2003 | Shahinpoor |
| 2004/0010180 A1 | 1/2004 | Scorvo |
| 2004/0024315 A1 | 2/2004 | Chalana |
| 2004/0059183 A1 | 3/2004 | Jozef et al. |
| 2004/0078067 A1 | 4/2004 | Thompson et al. |
| 2004/0102674 A1 | 5/2004 | Zadini et al. |
| 2004/0116769 A1 | 6/2004 | Jassawalla |
| 2004/0167375 A1 | 8/2004 | Couvillon |
| 2004/0225177 A1 | 11/2004 | Coleman et al. |
| 2004/0267086 A1 | 12/2004 | Anstadt |
| 2005/0113632 A1 | 5/2005 | Ortiz et al. |
| 2005/0148814 A1 | 7/2005 | Fischi et al. |
| 2005/0234289 A1 | 10/2005 | Anstadt et al. |
| 2006/0106442 A1 | 5/2006 | Richardson et al. |
| 2006/0129025 A1 | 6/2006 | Levine et al. |
| 2006/0142634 A1 | 6/2006 | Anstadt et al. |
| 2006/0167334 A1 | 7/2006 | Anstadt et al. |
| 2006/0211909 A1 | 9/2006 | Anstadt et al. |
| 2007/0197859 A1 | 8/2007 | Schaer et al. |
| 2008/0255629 A1 | 10/2008 | Jenson |
| 2008/0257412 A1 | 10/2008 | Gordon |
| 2009/0036730 A1 | 2/2009 | Criscione |
| 2009/0099498 A1 | 4/2009 | Demers et al. |
| 2010/0081867 A1 | 4/2010 | Fishler |
| 2010/0152523 A1 | 6/2010 | MacDonald et al. |
| 2010/0191071 A1 | 7/2010 | Anderson |
| 2011/0196189 A1 | 8/2011 | Milbocker |
| 2012/0095498 A1 | 4/2012 | Stefanchik et al. |
| 2013/0102849 A1 | 4/2013 | Criscione |
| 2015/0018607 A1 | 1/2015 | Akita |
| 2015/0080640 A1 | 3/2015 | Lillehei |
| 2016/0101230 A1 | 4/2016 | Ochsner |
| 2016/0151552 A1 | 6/2016 | Solem |
| 2016/0262889 A1 | 9/2016 | Laham et al. |
| 2016/0346449 A1 | 12/2016 | Roche |
| 2017/0080137 A1* | 3/2017 | Criscione ............ A61M 60/148 |
| 2017/0258593 A1 | 9/2017 | Good et al. |
| 2018/0153709 A1 | 6/2018 | Hunter |
| 2019/0224395 A1 | 7/2019 | Pilla et al. |
| 2020/0085579 A1 | 3/2020 | Kim |
| 2022/0013211 A1 | 1/2022 | Steinberg |
| 2022/0249830 A1 | 8/2022 | Kanz |
| 2023/0060284 A1 | 3/2023 | Siess et al. |
| 2023/0071248 A1 | 3/2023 | Keenan et al. |
| 2024/0216652 A1 | 7/2024 | Keenan et al. |
| 2024/0269459 A1 | 8/2024 | Schellenberg et al. |

* cited by examiner

MINIMALLY INVASIVE HEART PUMP WITH MODULAR ADJUSTABLE CONSTRUCT INSERTION

RELATED APPLICATIONS

This application is a continuation-in-part of U.S. patent application Ser. No. 18/447,786 filed Aug. 10, 2023.

This application is also a continuation-in-part of U.S. patent application Ser. No. 18/509,260 filed Nov. 14, 2023, which is a continuation-in-part of co-pending U.S. patent application Ser. No. 17/825,343 filed May 26, 2022, which is a continuation-in-part of U.S. patent application Ser. No. 17/208,776 filed Mar. 22, 2021, now U.S. Pat. No. 11,383,076, which claimed the benefit of U.S. Provisional Patent Application No. 63/086,478 filed Oct. 1, 2020.

This application is a further continuation-in-part of U.S. patent application Ser. No. 18/160,963, filed Jan. 27, 2023.

BACKGROUND OF THE INVENTION

1. Field of the Invention

In general, the present invention relates to cardiac assist systems and methods that help the heart pump blood by applying forces to the exterior of the heart. More particularly, the present invention relates to the structure of the cardiac assist systems, their methods of operation, and their methods of insertion into the body.

2. Prior Art Description

There are many instances when a heart needs assistance to properly maintain blood flow in a patient. Often hearts that are diseased, failing, or have stopped need the application of a cardiac assist system to prevent a patient from dying. Furthermore, utilizing a proper cardiac assist device can assist in the recovery of some deficient hearts. To minimize the dangers of thromboembolic events, hemolysis, immune reactions, infections, and the need for anticoagulation it is preferable that the pumping of the heart be assisted by applying forces to the external surfaces of the heart with no direct contact to the blood being pumped. However, in order to apply forces directly to the exterior of the heart, a cardiac assist device must be surgically introduced into the pericardial area.

In simple terms, the term "pericardial area" implies the area just outside the heart's epicardium or outer surface. Within the pericardial area, the heart is normally surrounded by the pericardium sac. The pericardial sac typically contains pericardial fluid, which protects and lubricates the heart. The pericardial area can contain fibrous connective tissue or scar tissue that extends between the epicardium of the heart and the pericardial sac. If the heart has been diseased or has been previously operated upon, there is often scar tissue within the pericardial area. Therefore, there may exist situations where only part of the heart's surface is amenable to the insertion or placement of a non-blood contacting heart pump. The most common example is that of a prior sternotomy or where a critical internal mammary artery bypass graft is in place. In either of these circumstances, the placement of a non-blood contacting heart pump that only lies over part of the ventricular surface would be on the back side or posterior aspect of the heart. Here the heart pump could provide reasonable support without risking the area of the internal mammary graft. Additionally, the posterior action of the heart pump would be countered by the natural location of the sternum that would facilitate the function of the heart pump. This modular approach would work in any selected region around the heart as well.

Accordingly, it can be difficult to position a cardiac assist device into the pericardial area. Cardiac assist devices, such as heart pump devices, are generally designed to contact, or fit around, the ventricles of a surgically exposed heart. Accordingly, such constructs are typically applied using open heart surgical techniques. Likewise, creating the required opening within the pericardial area is also often accomplished using open surgical techniques. However, open heart surgeries have many inherent problems. Open heart surgeries are highly invasive and can result in significant blood loss and infection risk. Furthermore, open heart surgeries require longer surgical times, longer stays at the hospital, and longer recovery periods. Lastly, open heart surgeries often leave visible scars on the chest of the patient.

It is for these and other reasons that many physicians and patients prefer minimally invasive surgical procedures. Minimally invasive heart surgeries involve making small incisions in the chest to reach the heart. The obvious problem is that heart pumps and like constructs that directly apply forces to the heart can be too large to use in traditional minimally invasive procedures. The result is that the surgical opening must be enlarged to accommodate the construct being inserted. Consequently, the minimally invasive procedure becomes more invasive than desired. This problem can be addressed by a surgical team in two ways. First, a smaller or partial construct can be used that is small enough to pass through the minimally invasive incision. Alternatively, a collapsible heart pump can be used. In both scenarios, some operational aspects of the heart pump must be compromised in order to make the heart pump collapsible. Furthermore, the versatility of the heart pump is important to avoid injury to areas where insertion is deemed to result in potential injury to a critical graft or scarring is too severe.

The heart is a complex organ that both empties and fills as it pumps. In order for a heart to pump blood effectively and efficiently, a heart often needs assistance in both filling and emptying. Computer imaging software has allowed intricate three dimensional understanding of conformational changes in the heart which can be characterized in three dimensional strain analyses. The interactions of a cardiac assist device and the heart can also be analyzed by software to calculate the ideal compression and expansion forces that the cardiac assist device should apply to the heart during the cardiac pumping cycle. The forces provided by the cardiac assist device can be further refined by controlling the pneumatic forces that operate the cardiac assist device to adjust for physiological changes imposed by the cardiovascular system.

In order for a cardiac assist device to assist a heart in emptying, the cardiac assist device must generally apply compressive forces to the exterior of the heart. There are several cardiac assist devices proposed for commercial use that are designed to apply compression forces to the heart and are also designed for use in minimally invasive surgical procedures. However, these prior art devices are collapsible structures that lack the physical integrity to apply anything but limited compressive forces to the heart. Furthermore, such prior art devices do not allow for inserting a pump that can selectively act on only part of the heart's surface when complete circumferential insertion is deemed not prudent. Such prior art devices are exemplified by U.S. Pat. No. 10,463,496 to Criscone and U.S. Pat. No. 11,511,102 to Criscone.

In order for a cardiac assist device to assist a heart in filling, the cardiac assist device must be able to apply tensile forces to the heart. In order for a cardiac assist device to apply tensile forces to the heart, the cardiac assist device must have the structural integrity needed to resist collapsing once the tensile forces are generated. Normally, this requires that the cardiac assist device have a ridged or semi-rigid shell such as that disclosed in U.S. Pat. No. 3,455,298, to Dr. George Anstadt. In the medical community, the device described in U.S. Pat. No. 3,455,298 is known as the Anstadt cup. The Anstadt cup is a cup-shaped construct that fits over the ventricles of the heart. The Anstadt cup has a stiff outer shell and an inflatable inner membrane. The outer shell and the inflatable membrane are placed around the ventricles of the heart. When the inflatable membrane expands, the inflatable membrane compresses the heart, therein helping the heart to empty. When the membrane deflates, there is a negative pressure that is created between the tissue of the heart and the stiff outer shell. The outer shell has the integrity to resist the resulting forces. As such, the forces are transferred to the heart, wherein the forces assist the heart in filling.

Since the Anstadt cup has a rigid outer shell that is sized to fit over the ventricles of the heart, the Anstadt cup cannot be collapsed and therefore utilized in a minimally invasive procedure.

Furthermore, since the outer shell of the Anstadt cup is rigid, the assistance provided to the heart's pump function is less than optimal. When the heart has an inherent pump function, the heart does more than fill and empty. During the pumping cycle, the heart also elongates and contracts. Likewise, ventricular tissue twists as it expands and contracts. A cardiac assist device that uses a rigid shell has a very limited ability to follow the heart surface as the heart elongates, contracts and/or twists. This is important in conditions where the heart has no pump function and is changing its conformation in response to the device's forces, as well as when the heart is exhibiting inherent pump function, and the device is aiding in promoting physiologic diastolic and systolic pump function. The result is an application of forces that are a compromise between what is mechanically achievable and what is needed to properly follow the heart's natural strain dynamics during filling and emptying.

A large need therefore exists for a cardiac assist device that can be utilized to apply the proper forces to a heart in order to optimize the heart's ability to both fill and empty, wherein the cardiac assist device is also collapsible so as to be usable during a minimally invasive procedure. A need further exists for a cardiac assist device that can be inserted on, or near, a heart where the pericardium area is complicated with fibrous tissue and/or scar tissue. A further need also exists for the device to be able to completely encompass the heart or partially encompass the heart depending of factors such as pre-existing scarring or critical implants from prior treatment or surgery. Finally, the device needs to have the ability to aid the heart in both heart filling and emptying to be efficacious. These needs are met by the present invention as described and claimed below.

SUMMARY OF THE INVENTION

The present invention is a cardiac assist device and its associated methods of installation and operation. A space is prepared in the pericardial area which ideally provide access around the entire ventricular surface or only a portion of the surface depending on the circumstances. Flexible guides are advanced into the prepared space using minimally invasive techniques. A heart pump construct is provided that can be collapsed and introduced in vivo through the same incision as is being used for the flexible guides. The heart pump construct is advanced into position in the pericardial area along the flexible guides. The flexible guides move the heart pump construct into operable position where the heart pump construct can act upon the heart. The flexible guides can also be used to connect modular components when a fully encompassing pump cannot be safely inserted.

Once in position, the heart pump construct is activated while still engaged with the flexible guides. The flexible guides provide structural integrity to the heart pump construct needed in order for the heart pump construct to function properly. The forces supplied to the heart by the heart pump construct are affected by the presence of the flexible guides. The structure of the flexible guides, the position of the flexible guides and the structure of the heart pump construct are customized to supply the forces needed by a particular heart in order to assist the heart in pumping more efficiently.

The delivery of suction which communicates with the space between the heart's surface and the pumping membrane facilitates the important aspect of assisting the heart's filling or diastolic pump function.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system and method can be varied in different ways, only a few embodiments are illustrated. The exemplary embodiments are being shown for the purposes of explanation and description. The exemplary embodiments are selected in order to set forth some of the best modes contemplated for the invention. The illustrated embodiments, however, are merely exemplary and should not be considered limitations when interpreting the scope of the appended claims.

Figure 1:
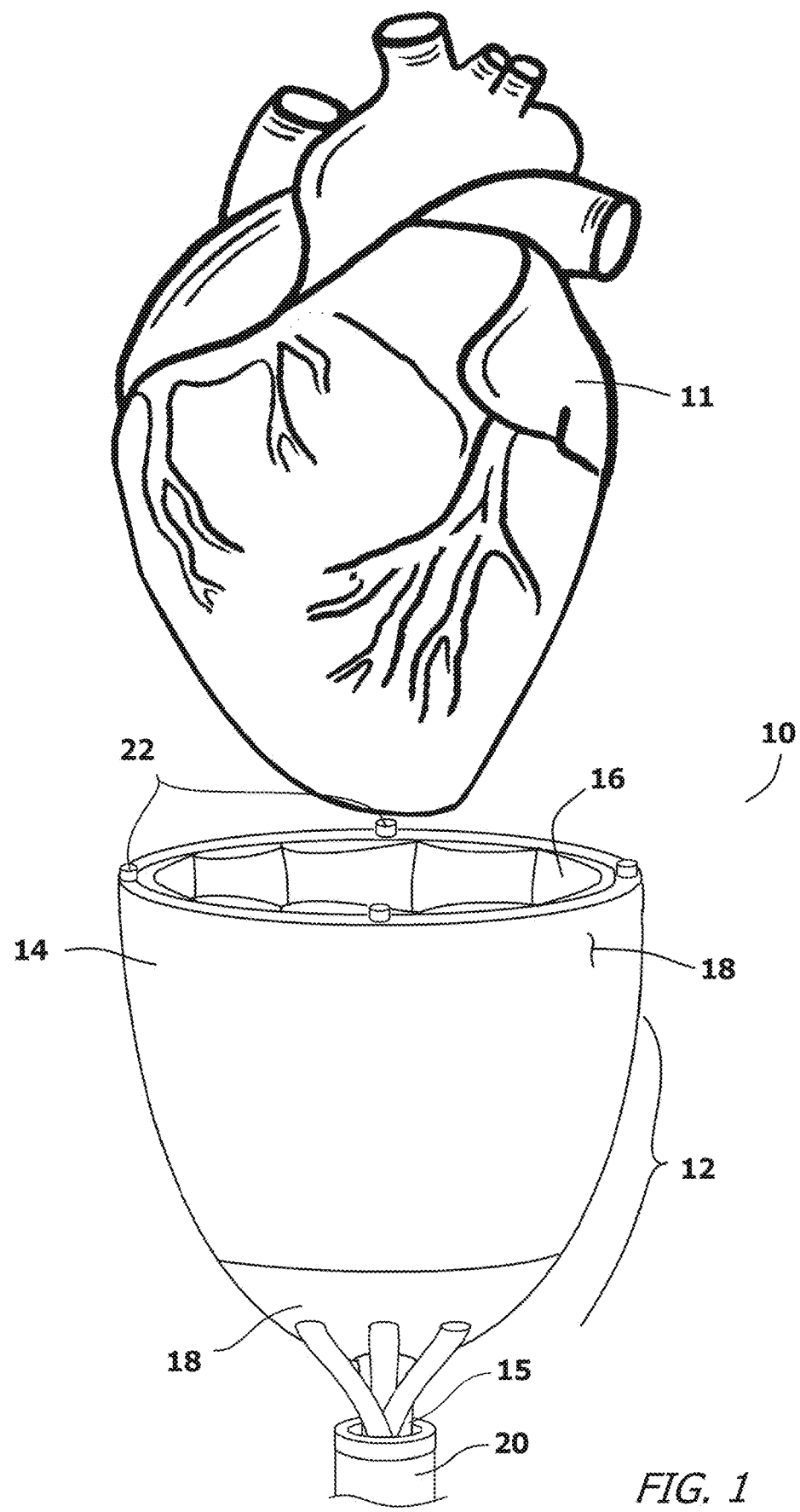
FIG. 1 shows a first exemplary embodiment of a cardiac assist device shown in conjunction with a heart.

Referring to FIG. 1, an improved cardiac assist system 10 is shown in conjunction with a heart 11. The cardiac assist device 10 contains a cup assembly 12. The cup assembly 12 includes an outer shell 14 that is internally lined with one or more inflatable membranes 16. The outer shell 14 is set upon a base 18 to complete the cup assembly 12. The outer shell 14, the inflatable membranes 16 and the base 18 are all capable of being collapsed, or folded, and passed through a surgical insertion tube 20 using minimally invasive surgical equipment and techniques.

One or more tubes 15 extend from the cup assembly 12. The tubes 15 are used to supply pneumatic pressure to the inflatable membranes 16. The tubes 15 are also used to supply suction to the cup assembly 12. The suction is used to drain blood and fluids from the cup assembly 12. However, the suction is primarily needed to retain the cup assembly 12 in place over the heart 11 as the cardiac assist device 10 is activated. The suction also helps guide the cup assembly 12 over the heart 11 as the cardiac assist device 10 is advanced into the body.

The outer shell 14 of the cup assembly 12 is reinforced with a plurality of flexible guides 22. As will be explained, the flexible guides 22 are used to position the cup assembly 12 around the ventricles of the heart 11. Once used to guide the cup assembly 12 into place, the flexible guides 22 are not withdrawn. Rather, the flexible guides 22 are left in place to provide structural integrity and reinforce the outer shell 14 of the cup assembly 12. Each of the flexible guides 22 has an inherent spring constant that enables the flexible guides 22 to be elastically displaced without permanent bending.

Figure 2:
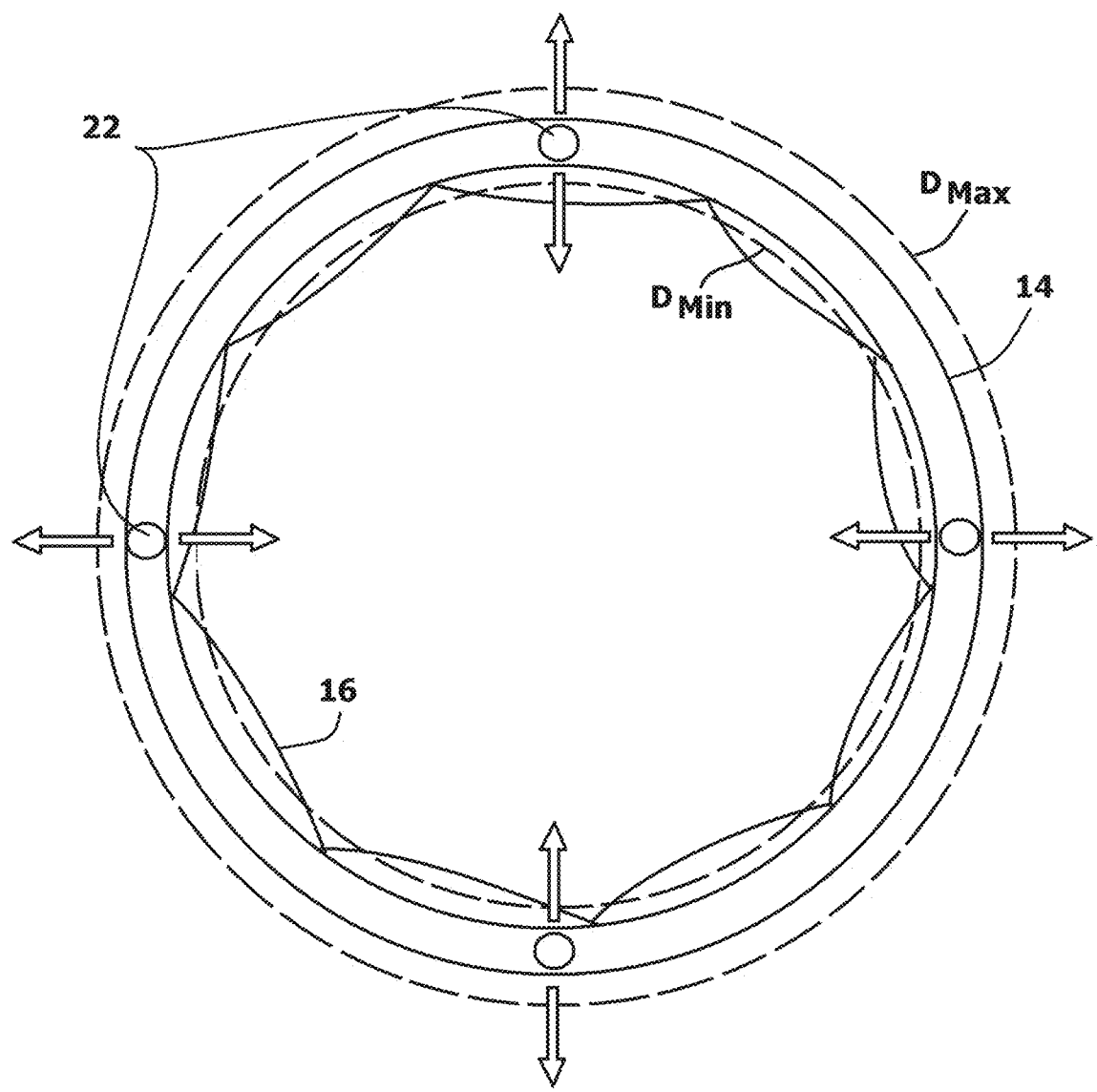
FIG. 2 shows a top view of the exemplary cardiac assist device to illustrate guide positions and range of expansion/contraction.

Referring to FIG. 2 in conjunction with FIG. 1, it can be seen that the presence of the flexible guides 22 in the outer shell 14 enables the outer shell 14 to elastically expand and contract within a range between a maximum diameter Dmax and a minimum diameter Dmin. However, the presence of the flexible guides 22 prevents the outer shell 14 from over expanding beyond the maximum diameter Dmax or collapsing under the minimum diameter Dmin. The presence of the flexible guides 22 also greatly effects the strain characteristics embodied by the outer shell 14 and the inflatable membranes 16 when all components are considered as an integrated unit. Accordingly, the presence of the flexible guides 22 effect the forces that the outer shell 14 and the inflatable membranes 16 apply to the heart 11.

In the shown embodiment, four flexible guides 22 are shown. Such a number is exemplary, and it should be understood that between three and eight flexible guides can be used. The number of flexible guides 22, the diameter of the flexible guides 22, the material of the flexible guides 22, and the inherent shape of the flexible guides 22 all effect the resiliency of the flexible guides 22 and the manner in which the flexible guides 22 react when stressed.

Figure 3:
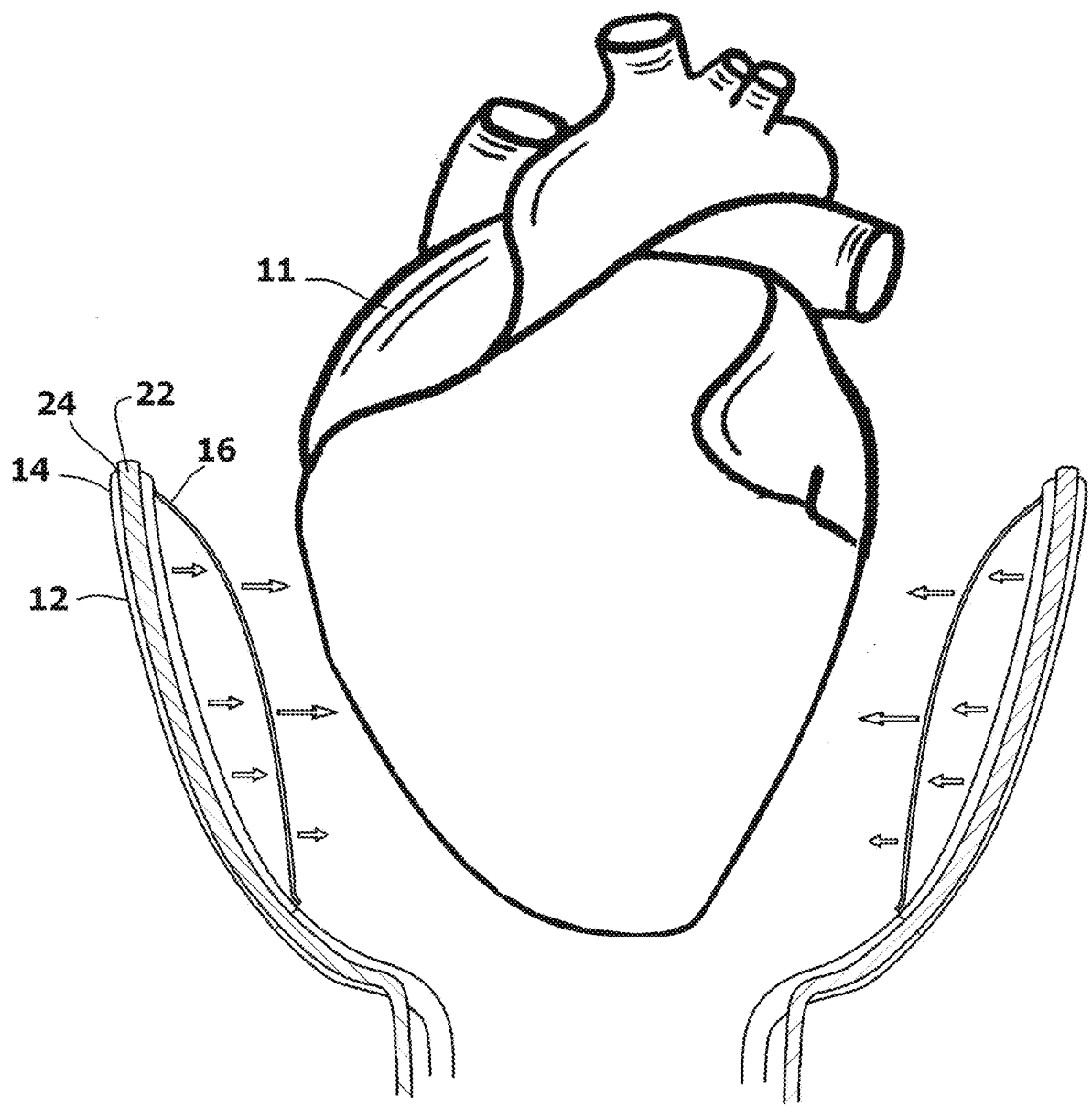
FIG. 3 is a partial cross-sectional view of the exemplary cardiac assist device to illustrate passage of flexible guides through conduits in the cup structure.

Referring to FIG. 3 in conjunction with FIG. 1 and FIG. 2, it will be understood that the flexible guides 22 pass through conduits 24 that are formed into the material of the outer shell 14. The outer shell 14 is flexible and is made from elastomeric material. Accordingly, the outer shell 14 has the ability to elastically expand, contract, elongate, shorten, and twist while being supported by the flexible guides 22. The resiliency of the flexible guides 22 and the elastomeric construction of the outer shell 14 enable the outer shell 14 to respond to physiological changes in the cardiovascular system that alter blood pressure and flow within the heart 11.

The inflatable membranes 16 are disposed in the interior of the outer shell 14. The inflatable membranes 16 are pneumatically inflated in a controlled manner that corresponds to the heart's pumping cycle. The inflatable membranes 16 are also made from elastomeric material. The inflatable membranes 16 contact the epicardium of the heart 11. Due to the wet environment in vivo and the suction being applied to the cup structure 12, the elastomeric material of the inflatable membranes 16 adheres to the tissue of the heart 11 that is being contacted. As the inflatable membranes 16 are inflated to different pressures, the inflatable membranes 16 apply either compressive or tensive forces to the heart 11.

During the heart pumping cycle, a deficient or non-functioning heart will require assistance to pump efficiently. The assistance required by the heart can be quantified in terms of point displacement over time. That is, different points on the heart need assistance to move different distances at different times during the heart pumping cycle. Strain is the ratio of change in point positions over original point positions. As such, the assistance required by the heart can be quantified in terms of strain. The strains that have to be applied to the deficient or non-functioning heart in order for the heart to pump efficiently are herein referred to as the heart's strain assist profile. The strain assist profile required by a heart is unique to that heart. If strains are applied to the heart that do not correspond to the needed strain assist profile, the heart will not pump efficiently and/or the heart may be further damaged or prevented from recovering. This is especially true if the strains being applied to the heart inhibits the natural pumping cycle in any way.

All forces applied to the heart 11 are applied through the application and operation of the cardiac assist device 10. The forces that the cardiac assist device 10 produce are dependent upon the strain characteristics of the inflatable membranes 16, the strain characteristics of the outer shell 14, the spring constants of the flexible guides 22, the number of flexible guides 22, the position of the flexible guides 22, and the inflation pressure profile used to selectively inflate/deflate the inflatable membranes 16. The strain characteristic of the inflatable membrane 16 and the outer shell 14 can be calculated using the techniques described in U.S. patent application Ser. No. 17/931,853 filed Sep. 13, 2022, and U.S. patent application Ser. No. 18/509,260 filed Nov. 14, 2023, the disclosures of which are herein incorporated by reference. The size and materials used for the flexible guides 22 are reflected in the spring constants of the flexible guides 22. Each spring constant is the ratio of the force acting on the flexible guide 22 in relation to the displacement of the flexible guide 22 caused by such forces.

Figure 4:
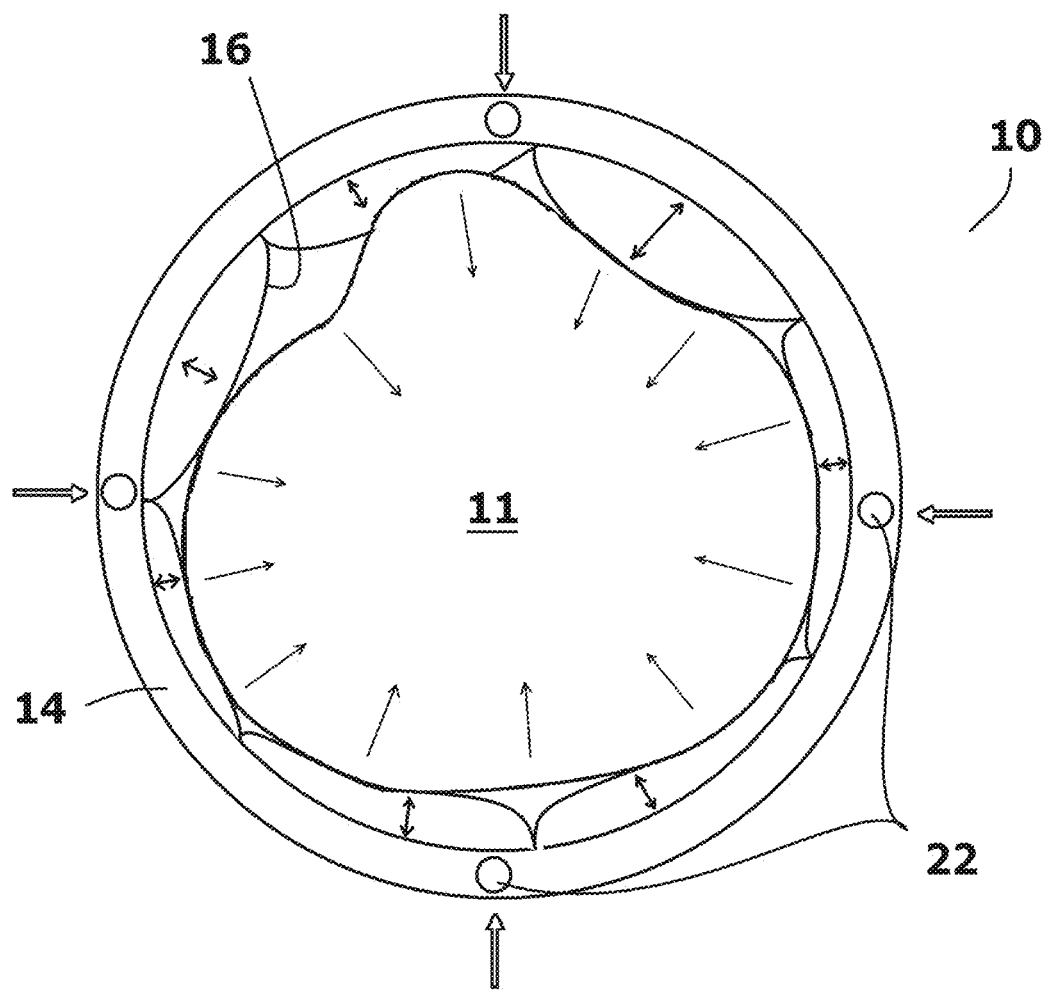
FIG. 4 shows a top view of the exemplary cardiac assist device helping the heart empty.

Referring to FIG. 4, it can be seen that when the heart 11 is emptying, the cardiac assist device 10 compresses the heart 11. The cardiac assist device 10 embodies overall strain characteristics that meet the strain assist profile of the heart 11 as it empties. To compress the heart 11, the inflatable membranes 16 inflate. The outer shell 14 prevents the inflatable membranes 16 from moving away from the heart 11 as they inflate and act upon the heart 11. The outer shell 14 is flexible and can move with the inflatable membranes 16 and the heart 11 as the heart 11 contracts, shortens, and twists. The outer shell 14 itself is reinforced by the flexible guides 22. The flexible guides 22 embody a spring constant.

Accordingly, the flexible guides 22 can also move in response to the movements of the heart 11 and the inflatable membranes 16. The combined strain characteristics of the inflatable membranes 16 and the outer shell 14 added to the spring constants of the flexible guides 22 are matched as close as possible to produce the strain assist profile required by the heart 11 when emptying.

Figure 5:
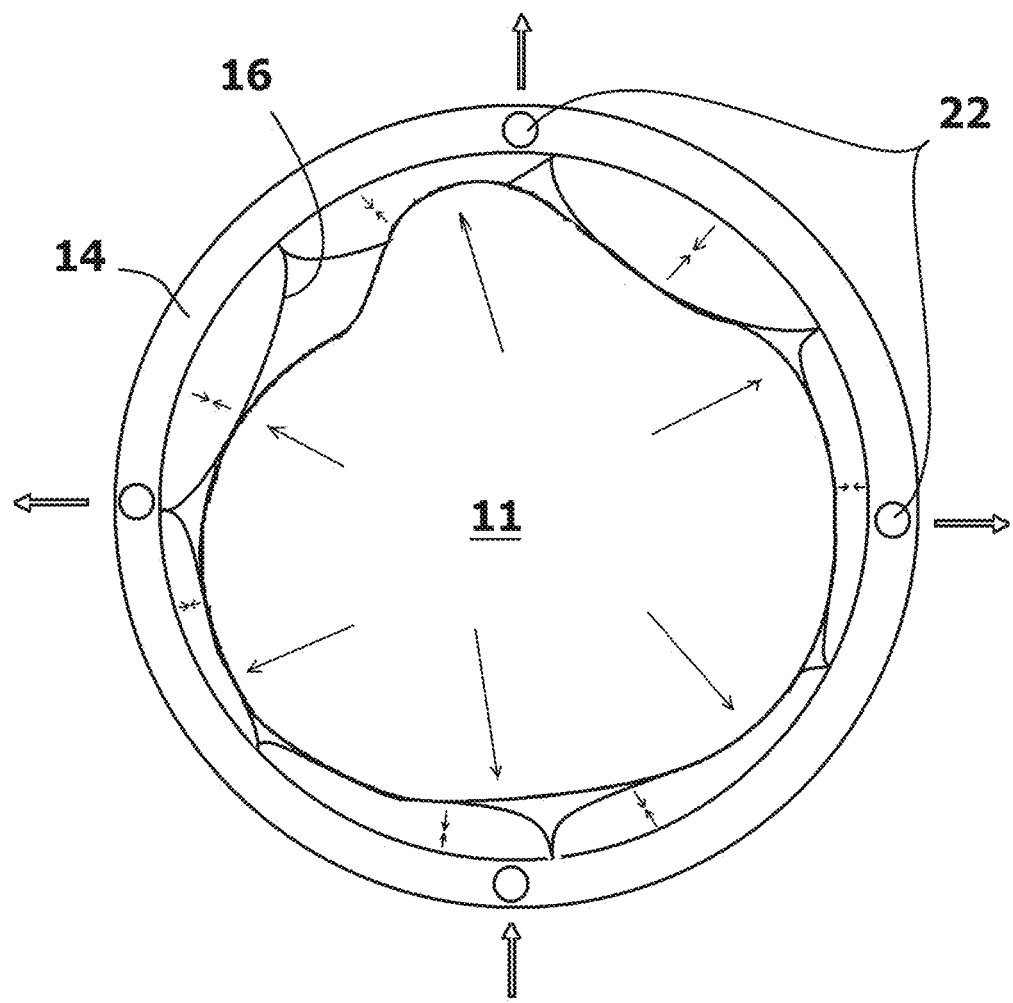
FIG. 5 shows a top view of the exemplary cardiac assist device helping the heart fill.

Referring to FIG. 5, it can be seen that when the heart 11 is filling, the cardiac assist device 10 helps the heart 11 expand. The cardiac assist device 10 embodies overall strain characteristics that meet the strain assist profile of the heart 11 as it fills. To help the heart 11 expand, the pressure in the inflatable membranes 16 is lowered. This creates low pressure between the heart 11 and the outer shell 14. The reinforcement provided by the flexible guides 22 prevent the outer shell 14 from collapsing toward the heart 11. Thus, the low pressure is maintained as the heart 11 fills. The combined strain characteristics of the inflatable membranes 16 and the outer shell 14 added to the spring constants of the flexible guides 22 are matched as close as possible to the strain assist profile required by the heart 11 when filling.

Figure 6:
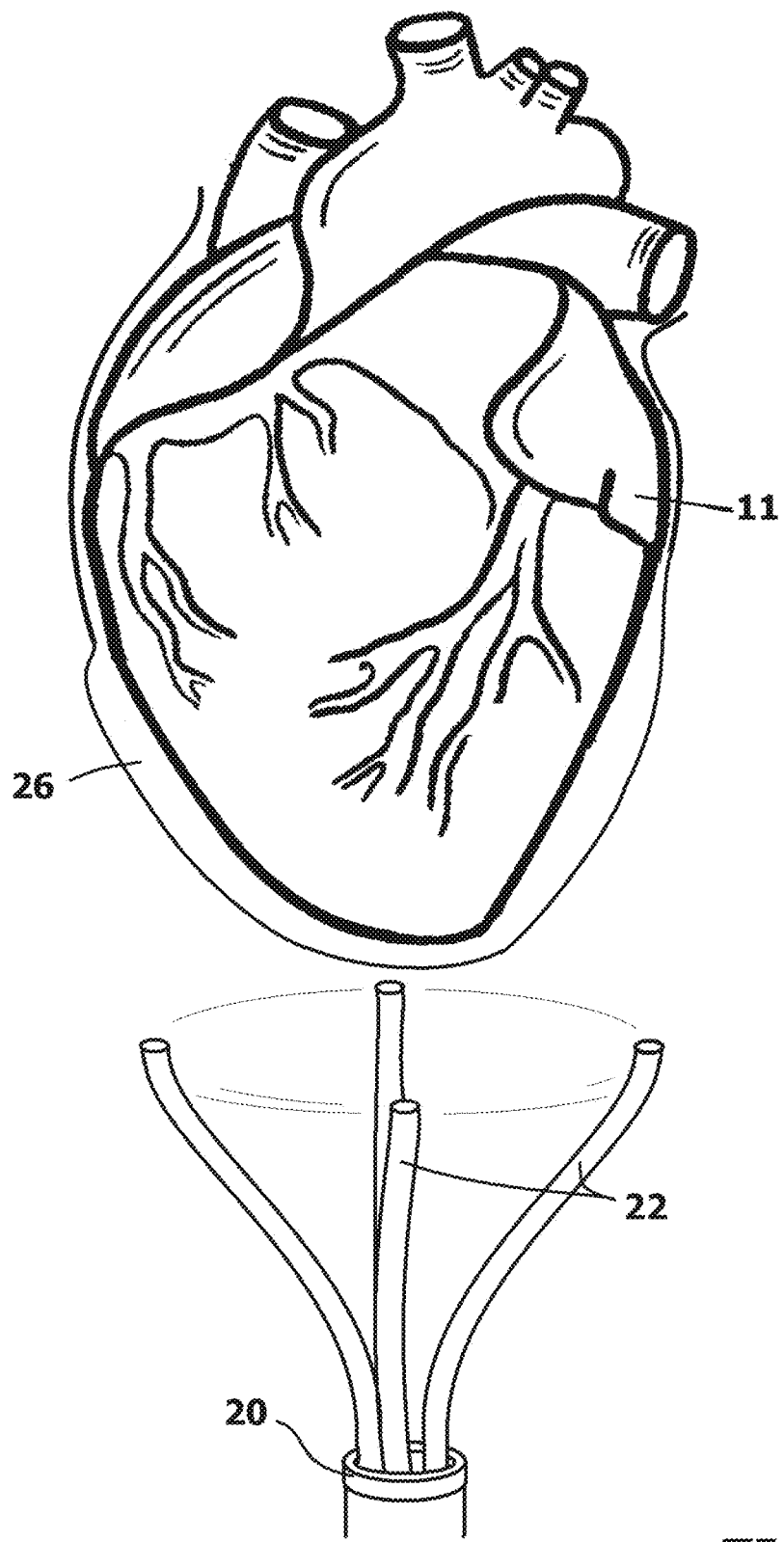
FIG. 6 illustrates the methodology of positioning the flexible guides near the heart.

Referring to FIG. 6 in conjunction with FIG. 1, it will be understood that to utilize the present invention cardiac assist device 10, a prepared space 26 is created in the pericardial area to accommodate the cardiac assist device 10. The flexible guides 22 are then advanced into position within the prepared space 26. The processes needed to create the prepared space 26 and to position the flexible guides 22 into the prepared space 26 are described in U.S. patent application Ser. No. 18/447,786 filed Aug. 10, 2023, the disclosure of which is herein incorporated by reference.

Figure 7:
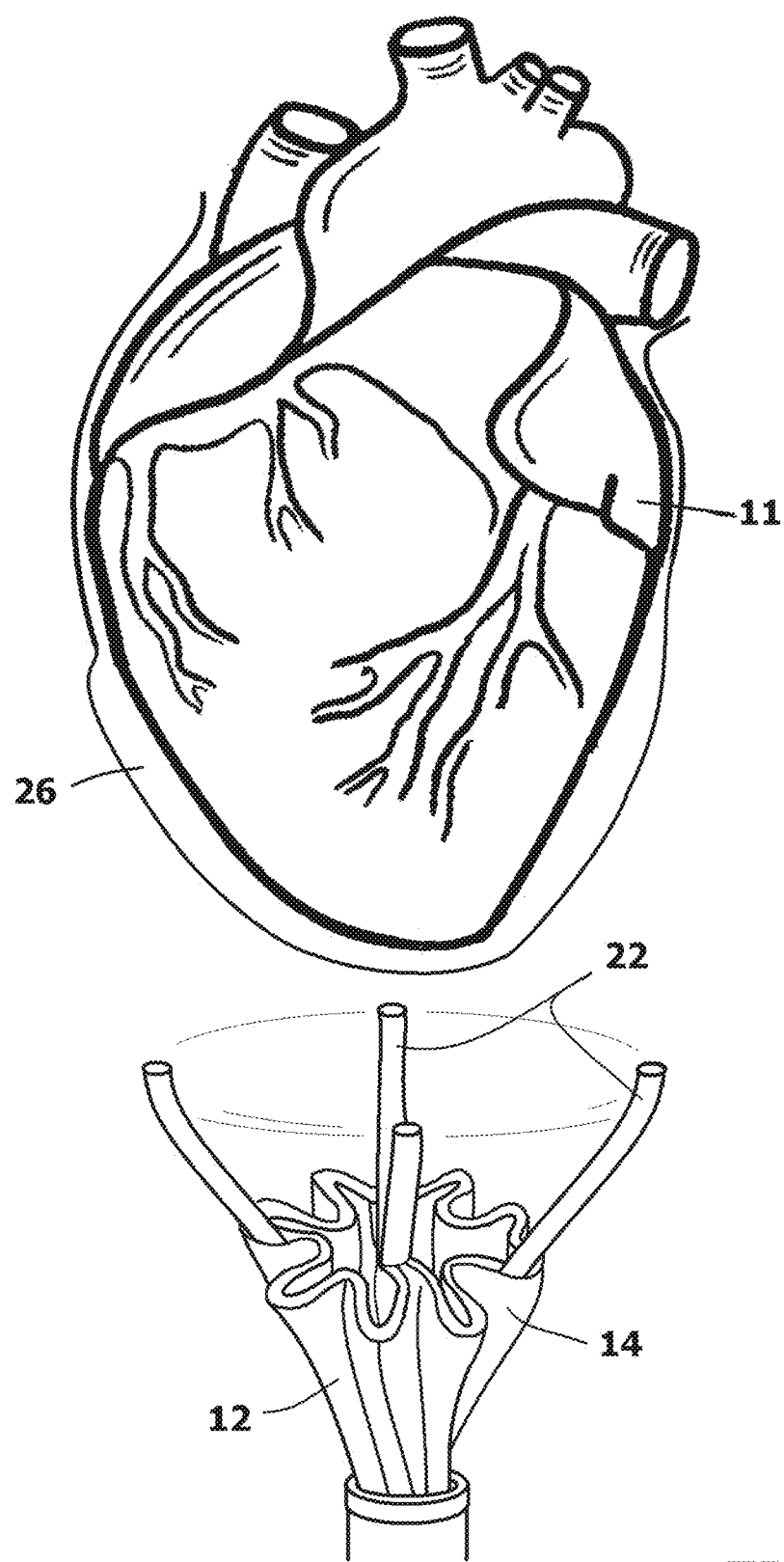
FIG. 7 illustrates a cup assembly in a collapsed condition being advanced along the flexible guides.
Figure 8:
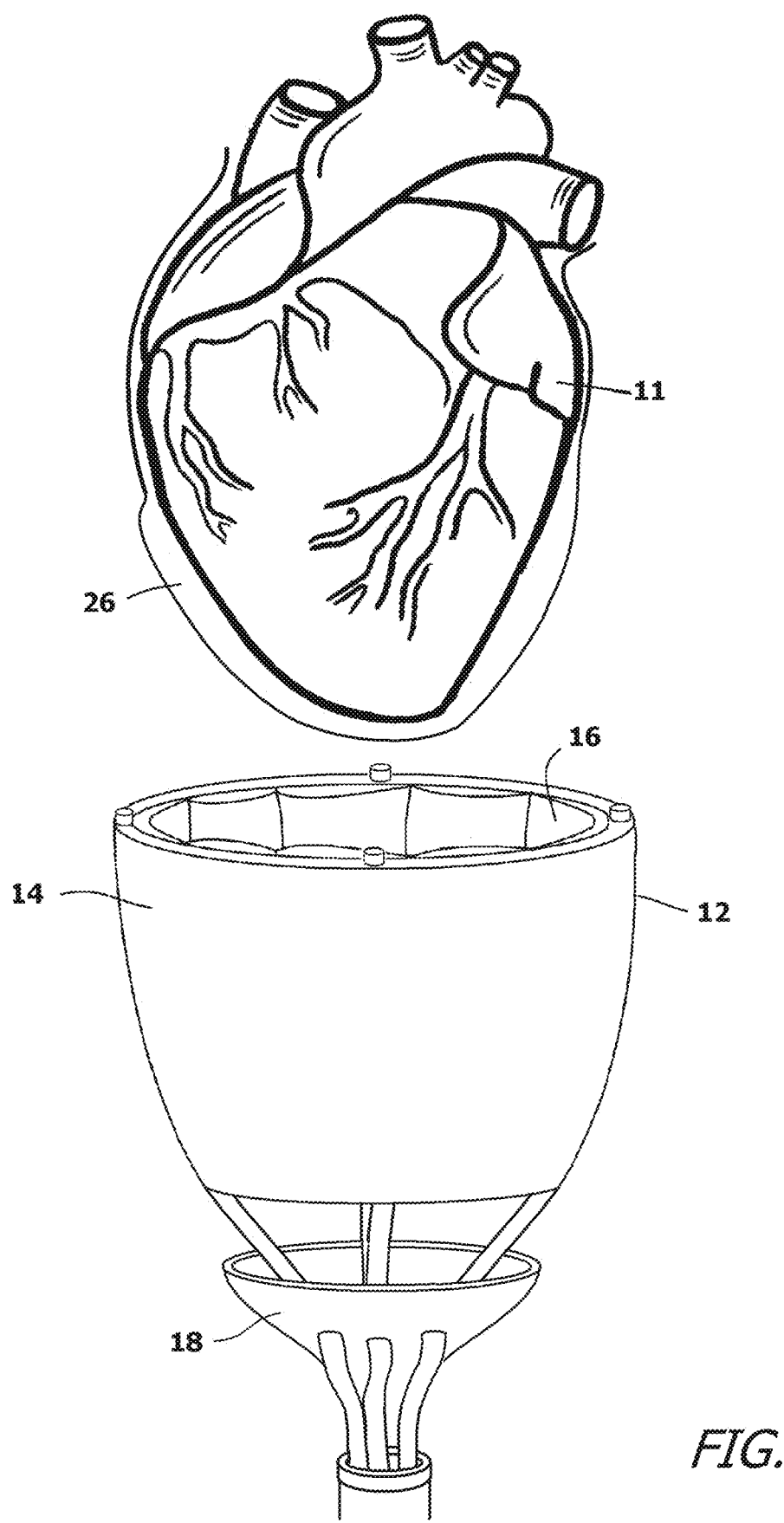
FIG. 8 illustrates a cup assembly in an open configuration being reinforced by the flexible guides.

The flexible guides 22 are advanced into the pericardial area using an insertion tube 20 and minimally invasive surgical procedures. Referring to FIG. 7 and FIG. 8, it will be understood that the cup structure 12, which includes the outer shell 14 and the inflatable membranes 16, is advanced along the flexible guides 22 and into the prepared space 26, using the same insertion tube 20 as used with the flexible guides 22. The tubes 15 that provide suction and pneumatic pressure to the cup structure follow through the insertion tube 20 behind the cup structure 12. Once in position, the base 18 of the cup assembly 12 is also advanced along the flexible guides 22 and is connected to the bottom of the outer shell 14. Suction is supplied through the tube 15. The suction holds the base 18 against the cup structure 12 and helps advance the cup assembly 12 over the ventricles of the heart. The presence of the flexible guides 22 enables the cup structure 12 from collapsing under the forces created by the suction, therein enabling the cup structure 12 to expand and pass over the ventricles of the heart 11.

Figure 9:
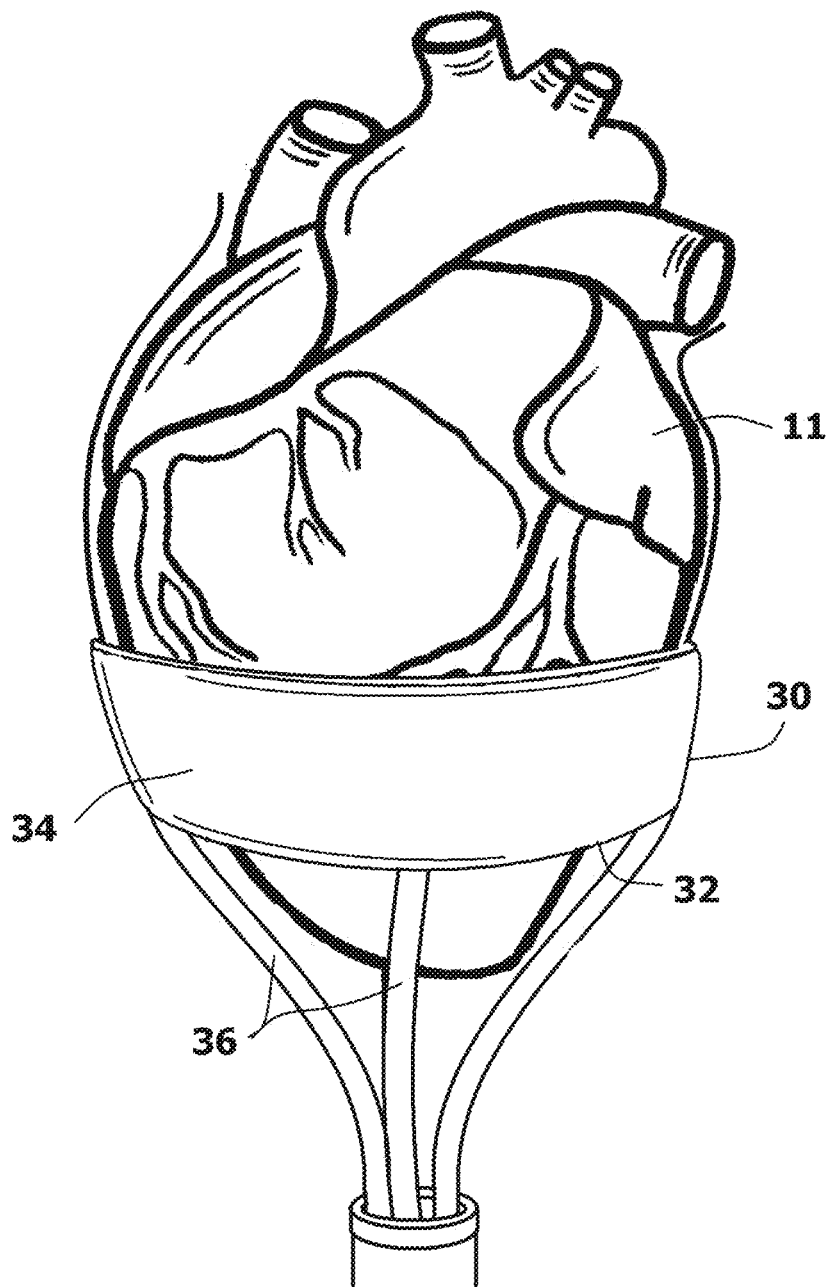
FIG. 9 shows a second exemplary embodiment of a cardiac assist device.

Referring to FIG. 9, an alternate embodiment of a cardiac assist device 30 is shown. In this embodiment, a cardiac assist device 30 is shown that provides an annular cuff 32 instead of a full cup. The annular cuff 32 has an outer shell 34 that encircles the heart 11. The outer shell 34 is structurally reinforced by the presence of flexible guides 36 that engage the outer shell 34.

Figure 10:
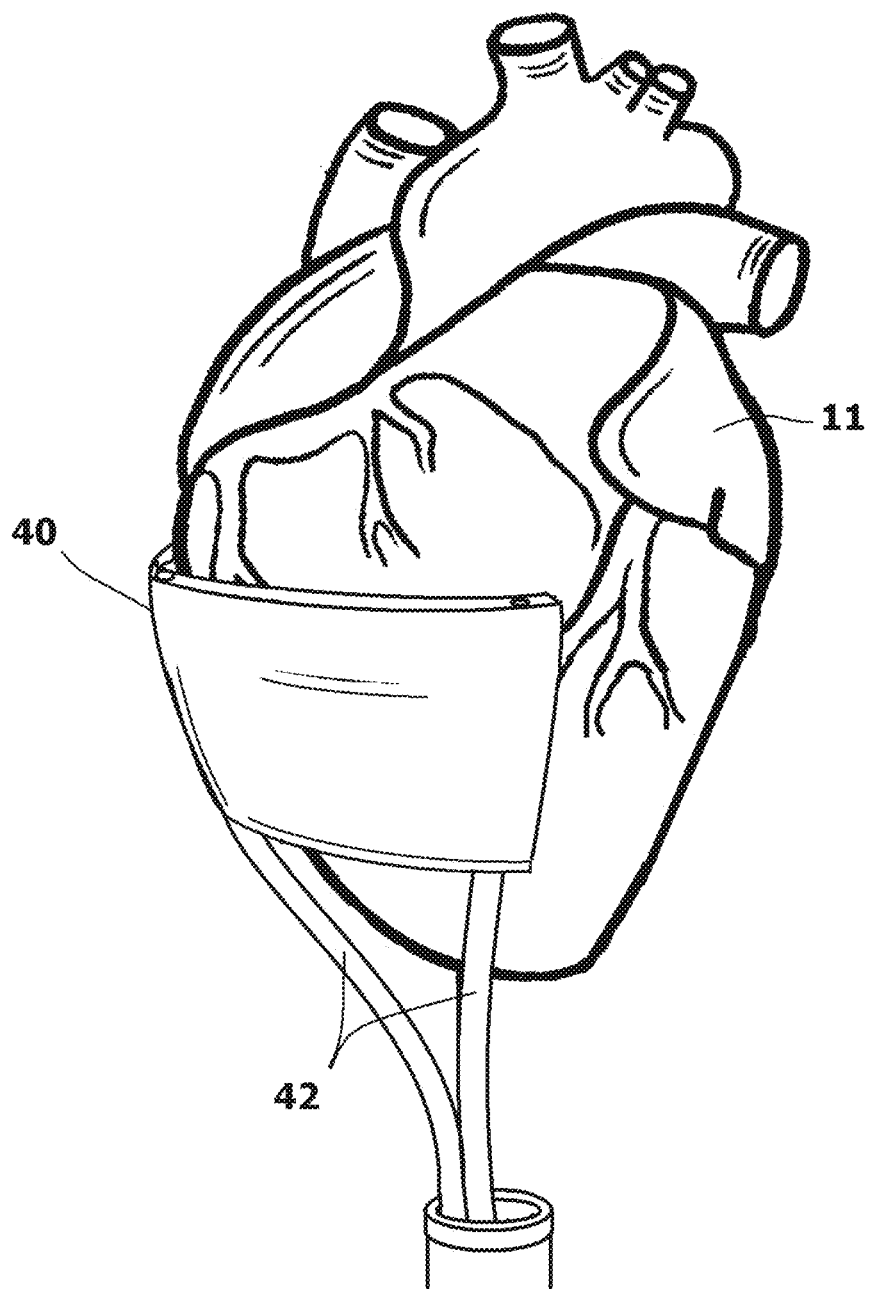
FIG. 10 shows a third exemplary embodiment of a cardiac assist device.

Referring to FIG. 10, a second alternate embodiment of a cardiac assist device 40 is shown that is designed to contact only one ventricular chamber of the heart 11. In this scenario, the placement of the cardiac assist device 40 is dependent upon flexible guides 42. Furthermore, the flexible guides 42 provide most all the forces needed to keep the cardiac assist device 40 in contact with the heart 11.

Figure 11:
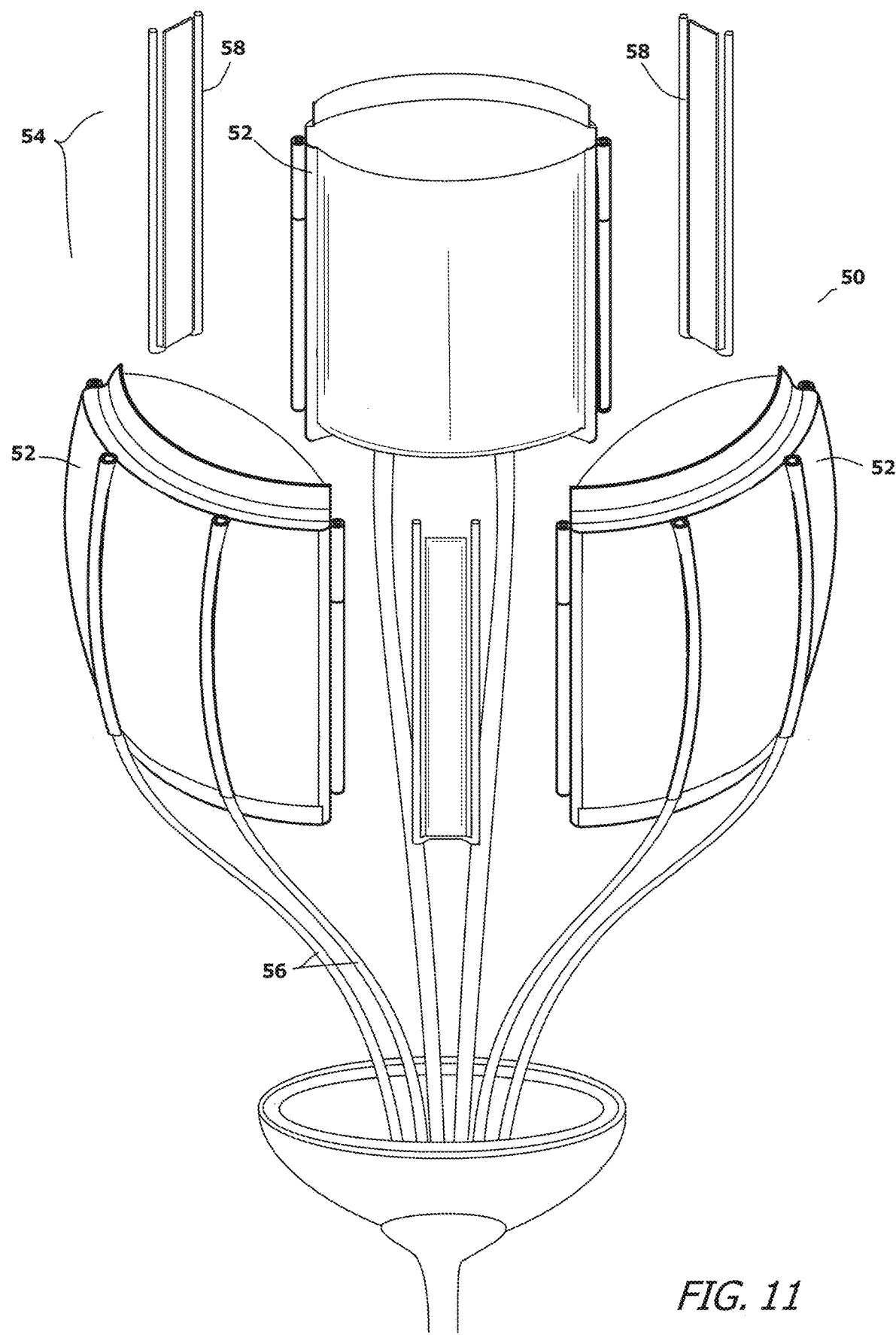
FIG. 11 shows a fourth exemplary embodiment of a cardiac assist device with a modular construction.

Referring to FIG. 11, a third embodiment of a cardiac assist device 50 is shown that is modular in design. A heart pump is formed in vivo by interconnecting modular segments 52 of a cup assembly 54. The structure for such a modular cup assembly is described in co-pending U.S. patent application Ser. No. 18/160,963, filed Jan. 27, 2023, the disclosure of which is herein incorporated by reference.

In the current adaptation, each of the modular segments 52 is supported by one or more flexible guides 56. The flexible guides 56 move and orient the modular segments 52 in vivo so that the modular segments 52 can be interconnected with connector panels 58. Once the modular segments 52 are interconnected into a full or partial cup structure, the flexible guides 56 provide the structural reinforcement needed for the cup assembly 54 to maintain position, resist collapse, and to apply the needed forces to the heart.

The use of modular segments 52 allows for the insertion of one module only in circumstances where the heart does not permit complete circumferential compression due to scarring or prior surgery, such as bypass grafts. An example of where a single module might be particularly useful is insertion on the back of the heart (posterior pericardial space) where the single module would act on the heart and have the advantage of the sternal bone providing a natural counter force. The sternal bone and associated anterior aspect of the heart is where scarring would be notable most prominent from any prior surgery and also where the most critical bypass graft (internal mammary artery) would lie. Modular concept would allow "building" around the heart with 2 or more modules to either partially or completed encompass ventricles.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A cardiac assist device, for applying controlled forces externally to a heart that improve both the systolic and diastolic functions of the heart, comprising:
   a plurality of flexible guides;
   an outer shell lined with inflatable membranes;
   conduits extending through said outer shell, wherein said plurality of flexible guides extend into said conduits and said outer shell is free to move along said plurality of flexible guides, and wherein said plurality of flexible guides prevent said outer shell from expanding beyond a maximum diameter and collapsing under a minimum diameter when said cardiac assist device acts upon the heart;
   wherein said outer shell, said inflatable membranes and said plurality of flexible guides act together to provide said controlled forces externally to the heart that improve both said systolic and diastolic functions of the heart;
   further including a base that attaches to said outer shell to form a cup structure, wherein said plurality of flexible guides pass through said base.

2. The device according to claim 1, wherein said plurality of flexible guides are free to slide through said conduits in said outer shell.

3. The device according to claim 2, wherein said outer shell is made from elastomeric materials and is collapsible for insertion in vivo.

4. The device according to claim 3, wherein said outer shell has a collapsed configuration and an operable configuration, wherein said flexible guides maintain said outer shell in said operable configuration.

5. The device according to claim 1, wherein said outer shell, said inflatable membranes, and said plurality of flexible guides combine to produce said controlled forces when said inflatable membranes are selectively inflated.

* * * * *